June 11, 1963 F. P. RODWICK ETAL 3,093,061
COFFEE BREWER
Filed May 27, 1959 3 Sheets-Sheet 2
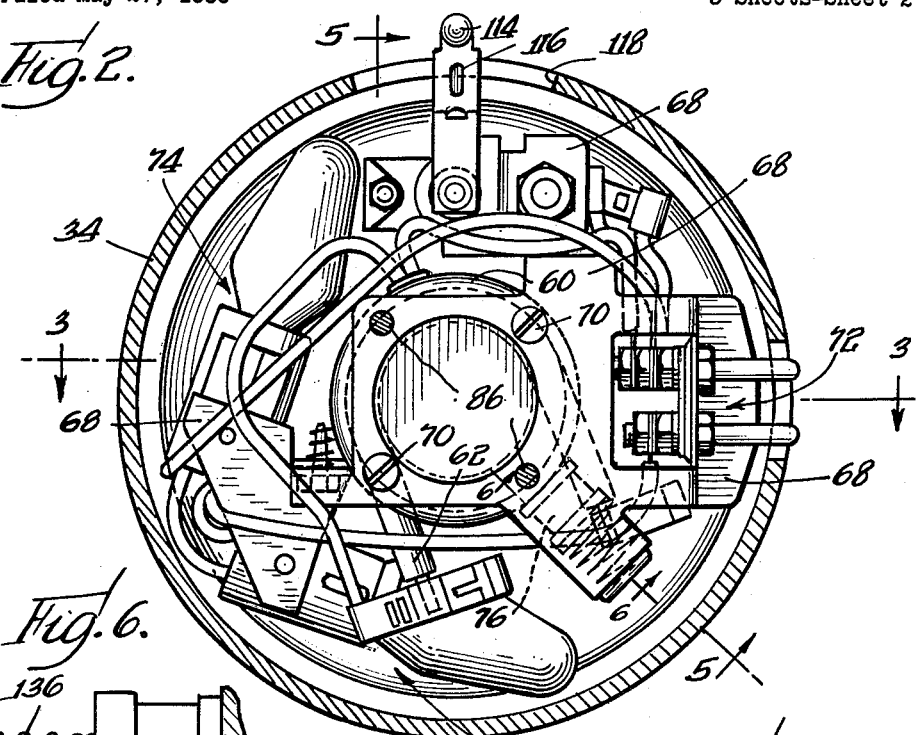
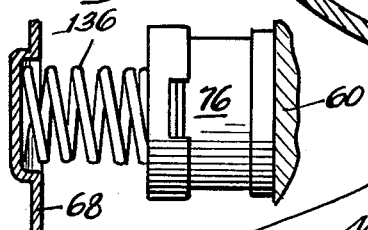
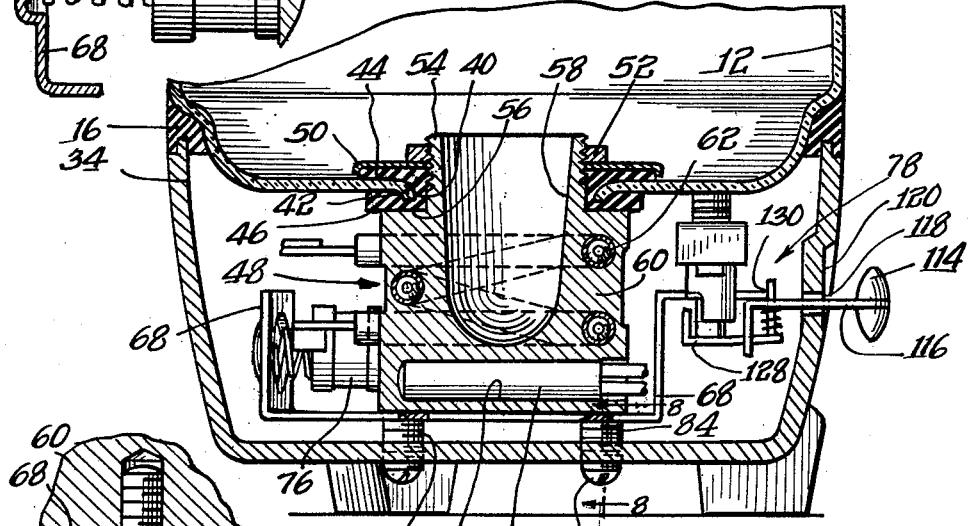
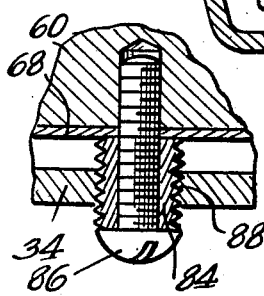
INVENTORS.
Frank P. Rodwick
Nicholas T. Thome
By: Olson & Trexler attys June 11, 1963 F. P. RODWICK ETAL 3,093,061
COFFEE BREWER
Filed May 27, 1959 3 Sheets-Sheet 3
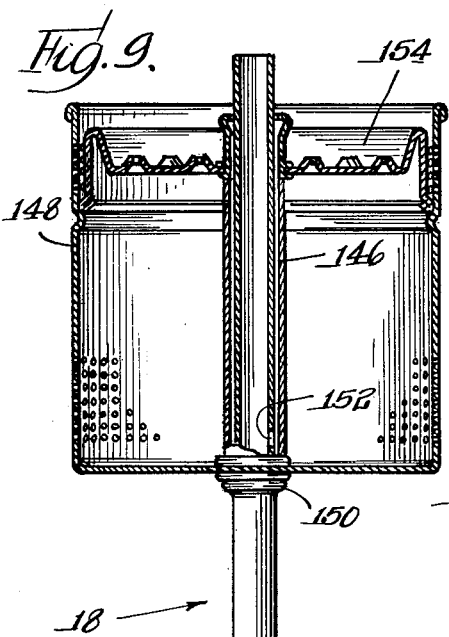
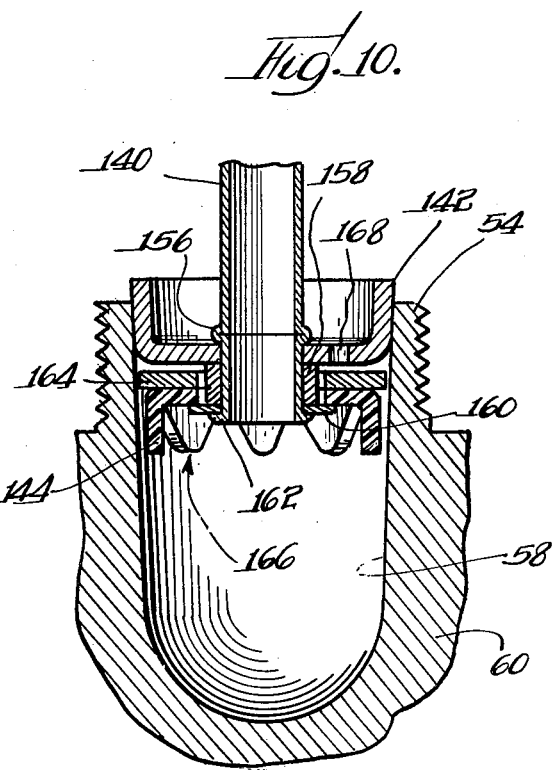
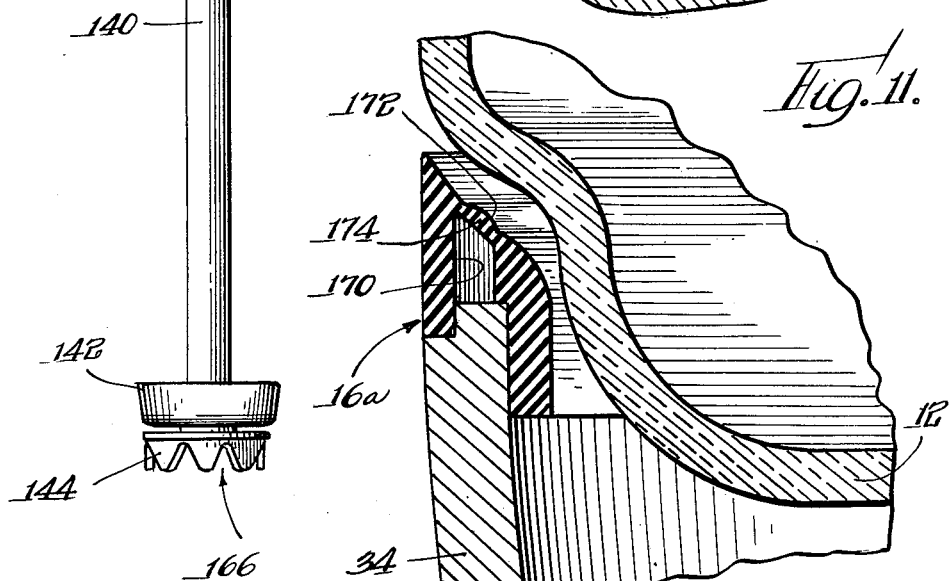
INVENTORS
Frank P. Rodwick
Nicholas T. Thome
By: Olson & Trexler attys.

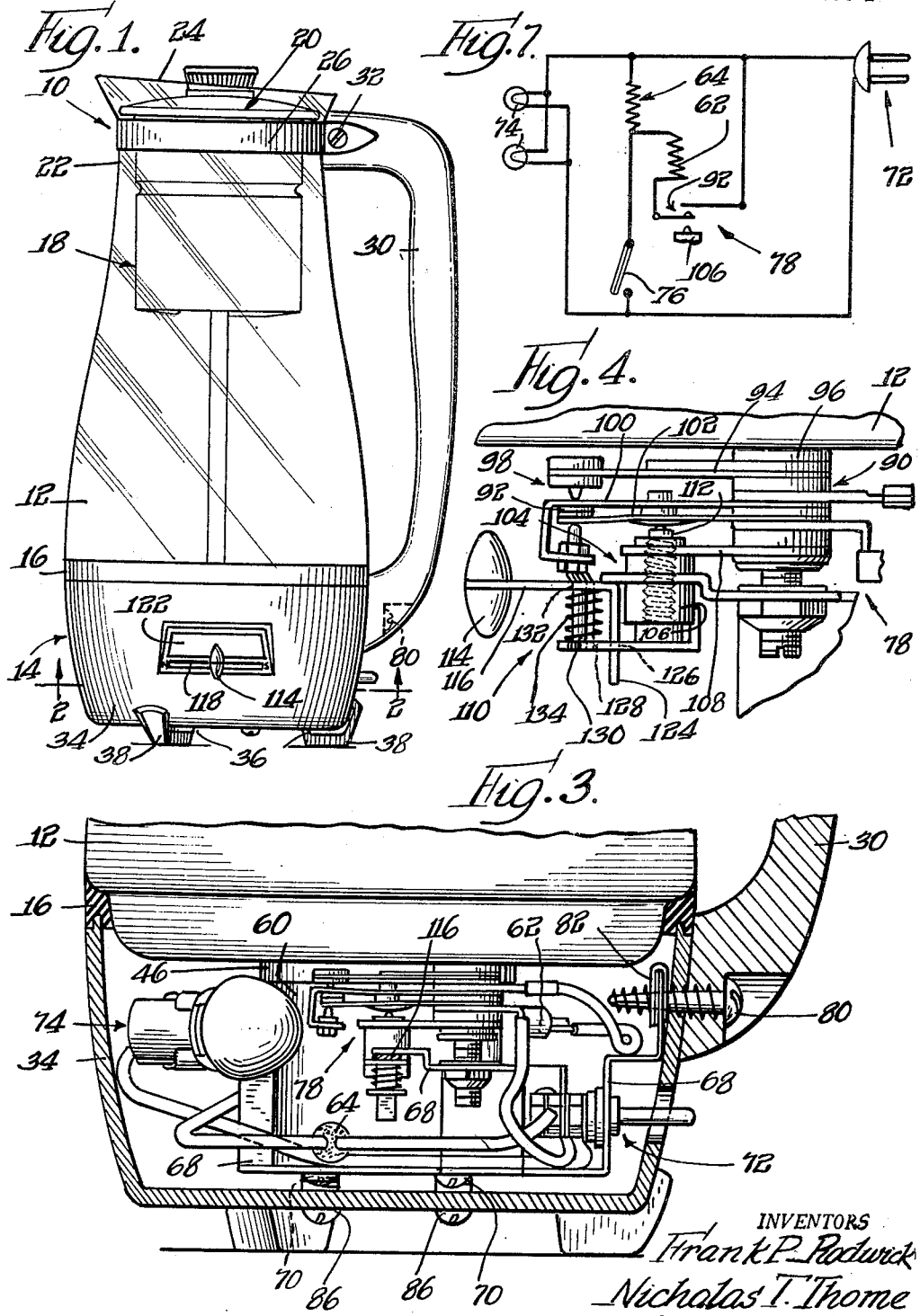

United States Patent Office 3,093,061
Patented June 11, 1963

3,093,061
COFFEE BREWER
Frank P. Rodwick, Palos Heights, and Nicholas T. Thome, Worth, Ill., assignors to The Silex Company, Hartford, Conn., a corporation of Connecticut
Filed May 27, 1959, Ser. No. 816,290
2 Claims. (Cl. 99—281)

This invention relates generally to coffee brewers of the percolator type and especially to an automatic coffee brewer of the percolator type which utilizes a glass brewing vessel.

As is well known, a large proportion of the coffee consuming public expresses definite preference for coffee brewed by the percolator method; and it has been long recognized that glass brewing vessels possess a distinct advantage over metal brewing vessels, particularly with regard to insuring a true coffee taste unimpaired by metallic off-flavors.

However, glass brewing vessels have not heretofore been extensively used in coffee brewers of the percolator type because the percolation method of coffee brewing requires rapid heat transfer, and glass is known to be a characteristically poor thermal conductor. This shortcoming is particularly vexing in the case of automatic percolators since no practical way of embedding heating elements in glass has been developed to date.

Therefore, a general object of the present invention is to provide an improved automatic percolator which combines the advantages of a glass brewing vessel with the advantages of a heat pump of high thermal conductivity.

In the past, certain practical mechanical problems have erected barriers to the provisions of a generally suitable, automatic coffee brewer of the glass-vessel percolator type. The gasket which provides a seal between the glass vessel and the thermal unit is prone to heat deterioration and damage. There results foreshortened use-life because of the proximity of the gasket to the intense heat of the thermal unit. This problem is seriously aggravated by inadvertent operation of the coffee brewer in the absence of a reasonable volume of liquid in the brewing vessel.

It is, therefore, another object of the invention to provide an automatic coffee brewer of the glass-vessel percolator type which is unable to subject the main sealing gasket to serious thermal overloads.

Securing the glass vessel to a base assembly has also presented difficulties in prior art percolators of the present type. Frequently, cracking or even actual fracture of the glass vessel has resulted from tightening the screws or other appliances used to fasten the vessel to the base assembly.

Therefore, still another object of the invention is to provide an automatic percolator which incorporates means for safely fastening the glass brewing vessel to the base assembly.

Yet another object of the invention is to provide a coffee brewer of the glass-vessel percolator type which employs a novel arrangement of the operating knob, which arrangement precludes operation of the knob from interfering with proper control of the automatic functioning of the brewer.

A further object of the invention is to provide an automatic percolator which, when brewing coffee, heats small slugs of water in rapid succession, expelling each through the ground coffee particles.

A still further object of the invention is to provide improved control means for automatic coffee brewers of the glass-vessel percolator type.

Additional objects and features of the invention pertain to the particular structure and arrangement whereby the above objects are attained.

The invention, both to its structure and mode of operation, will be better understood by reference to the following disclosure and drawings forming a part thereof, wherein:

FIG. 1 is a side elevational view of a coffee brewer in accordance with the present invention;

FIG. 2 is an enlarged, bottom view taken through the section 2—2 of FIG. 1;

FIG. 3 is a partially cut away, side elevational view through the section 3—3 of FIG. 2;

FIG. 4 is a further enlarged, fragmentary view showing the low temperature, thermally responsive switch arrangement used in the coffee brewer of FIG. 1;

FIG. 5 is a partially cut away, side elevational view taken through the section 5—5 of FIG. 2;

FIG. 6 is a further enlarged, fragmentary view of the high temperature, thermally responsive switch, taken through the section 6—6 of FIG. 2;

FIG. 7 is a schematic circuit diagram illustrating control means used in the coffee brewer in FIG. 1;

FIG. 8 is an enlarged, fragmentary view taken through the section 8—8 of FIG. 5 showing the method of mounting the bottom to the heating unit;

FIG. 9 is an elevational view in partial section showing the details of the coffee basket and pump tube assembly of the invention;

FIG. 10 is a cross-sectional, fragmentary view showing the pump tube assembled to the heat pump; and FIG. 11 is a cross-sectional, fragmentary view showing a variation in the gasket used in mounting the glass brewing vessel to the bottom.

Referring now in detail to the drawings, specifically to FIG. 1, there will be seen a coffee brewer 10 including a glass brewing vessel 12 resiliently mounted to a base assembly 14 by means of a resilient gasket 16. Coffee brewer 10 also includes percolation means defining a coffee basket, fluid spreader and pump tube assembly 18. A cover assembly 20 is also provided.

The upper end of the glass vessel 12 defines a throat portion 22 which terminates in a pouring mouth 24. About the throat 22 there is disposed a handle-supporting band 26, the ends of which form a sleeve 28 which may be fastened about the upper end of a handle 30 by means of a screw 32.

Vessel 12 is preferably fashioned from heat resistant glass and is desirably clear over the major portion of its upper part so as not to obscure visual inspection of the brewed coffee.

In one specific embodiment, it has proved advantageous to fabricate handle 30 and the bottom 34 of base assembly 14 from a suitable plastic material. Accordingly, a number of feet 36 may be affixed to the bottom 34 as by molding, feet 36 being conveniently and subsequently provided with metal caps or toes 38.

Turning now to FIG. 5, it will be seen that the vessel 12 is provided with a central aperture 40 disposed in its lower end. The edges 42 of aperture 40 are preferably outwardly formed or flared.

Edges 42 are received within a mating slot 44 in a main sealing ring or gasket 46 which is preferably made from a heat resistant rubber. Gasket 46 facilitates mounting a heating unit 48 to the bottom of vessel 12, sealing the same against leakage. Advantageously, a metal washer 50 extends over the upper surface and about the upper edge of gasket 46 in order to cooperate with a nut 52 which threadedly engages the periphery of a projection 54. Tightening of the nut 52 compresses the gasket 46 between the washer 50 and a shoulder 56 of the heating unit 48 establishing a seal.

Projection 54 defines an arcuate well or recess 58 which opens into the body of the glass vessel 12 so as to provide a heat pump as will be brought out more fully hereinafter.

Heating unit 48 includes a body portion 60 which may take the form of a metal casting, conveniently an aluminum die casting. Body portion 60 incorporates therein a high capacity electric heater or tubular heating element 62. Element 62 may conveniently be a 500 watt heater, for example. Body portion 60 may also incorporate a warming element or low capacity electric heater 64. Heater 64 may take the form of a 45 watt element, for example.

When body portion 60 is formed by casting, heater 62 may be cast therein as an insert whereas heater 64 may be cemented subsequently into a bore 66 suitably provided in the casting. As shown, heater 62 may be wound about the lower portion of recess 58 so as to insure efficient heating of liquid contained in the recess. Similarly, heater 64 may be disposed conveniently near the bottom of recess 58.

According to the general showing of FIGS. 2, 3 and 5, a bracket member 68 is affixed suitably to the bottom of body member 60, as by screws 70. Bracket member 68 is of irregular shape and bends about body member 60 to support various control elements.

Among the elements supported by the bracket member 68 is the prong-type terminal assembly 72 which is used in making electrical connection to a suitable source of power by means of a conventional cord set, not shown. Also supported by the bracket member 68 are a pair of lamp-and-socket assemblies 74; a high-temperature thermally responsive switch 76; and a low-temperature thermally responsive switch arrangement 78.

With particular reference to FIG. 3, bracket member 68 is also available for assisting in securing the handle 30 to the bottom 34 as by means of a screw 80 which passes through the handle 30 and through the sidewall of bottom 34 to engage a lock nut 82 cooperatively received about one arm of the bracket 68.

Bracket 68, as best shown in FIG. 8, is further secured to the body member 60 by means of the adjusting sleeves or hollow set screws 84. Fastening screws 86 pass through the smooth bores of the set screws 84 to engage the member 60.

In assembling vessel 12 to bottom 34, set screws 84 are advantageously inserted through threaded apertures 88 in the lower surface of bottom 34. Set screws 84 are inserted through the apertures 88 until they barely make contact with the bracket 68 which is juxtaposed with the body member 60. Being so positioned, set screws 84 predetermine the force with which gasket 16 may be compressed against the vessel 12. Accordingly, subsequent tightening of the screws 86 into the body member 60 is precluded from causing excessive strain in the vessel 12, thereby obviating the possibility of damage to the vessel 12 on assembly.

Turning now to FIG. 4 for a more detailed description of the low-temperature thermostatic switch arrangement 78, it will become apparent that switch arrangement 78 includes a conventional snap acting switch 90 whose contacts 92 are normally closed. A low-temperature thermostat 94, taking, for example, the form of a bimetallic thermostat, is secured in insulated relationship to the snap acting switch 90. Sensing of the temperature of the liquid within the vessel 12 is accomplished by means of the conductive button 96 which engages the lower surface of the vessel 12 and communicates with the thermostat 94.

In response to increases in temperature of the liquid within the vessel 12, thermostat 94 will gradually urge a dielectric element 98 downward. When the temperature of the brewing coffee reaches that temperature which indicates the beverage is properly brewed, element 98 will have been urged against a leaf 100 in such a fashion that a spring 102 will overcenter to open contacts 92.

The exact point at which thermostat 94 will cause opening of the contacts 92 is adjusted by means of a jack 104. Jack 104 may conveniently be comprised of an internally threaded bushing 106 which is secured to the switch 90 by means of a plate 108 and which contains a vertically reciprocable pin 112 having a cooperative thread formed thereon. An operating knob assembly 110 is adapted to raise or lower pin 112 into contact with the spring 102 so as to predispose overcentering thereof to occur when the coffee has been brewed to the desired degree. Such arrangements are old as is exemplified in U.S. Patent No. 2,715,167.

The operating knob assembly 110 includes a knob 114 which is affixed to one end of an arm 116 so as to be extended through a horizontal slot 118 in the sidewall of bottom 34. Advantageously, slot 118 is provided in a shallow recess 120 over whose surface an escutcheon 122 may be fastened, as by adhesive.

Arm 116 terminates at its other end in a vertically depending tongue 124 which extends through an elongated slot 126 in a lever 128. Lever 128 has upraised therefrom a vertical tongue 130 which extends through a slot 132 in the arm 116. A coil spring 134 advantageously is inserted about the tongue 130 so as to bias the arm 116 in a generally upward direction.

Lever 128 is appropriately secured to the jack 104 so that the reciprocations of lever 128 in the horizontal plane may be transmitted to the pin 112 to affect raising and lowering thereof.

It will become apparent that, by providing an operating knob assembly 110 as described, horizontal motions may be transmitted to the jack 104 for operation thereof while vertical motions tending to displace the thermostat 94 from its intimate contact with the bottom of vessel 12 are precluded. Proper operation of the switch arrangement 78 is thereby insured.

With reference to FIG. 6, high-temperature thermostat 76 is biased into intimate contact with the body member 60 as by means of a coil spring 136 whereby proper functioning of the thermostat 76 is insured.

For purposes of providing an easy understanding of the invention, it is advantageous to provide at this juncture a functional description of the mode of operation of the component parts thus far identified, given with special reference to FIG. 7.

When terminal assembly 72 is connected to a suitable source of power, it will become apparent that the lamps 74 will be lighted. The illumination emanating from the lamps 74 will be transmitted through the bottom of the glass brewing vessel 12, the bottom of this vessel being preferably etched, frosted or coated so as to diffuse the light uniformly throughout the liquid contained within the vessel. Thus, it is apparent that whenever power is applied to the coffee brewer, there will be provided a visual indication of the color of the beverage contained within the vessel 12 and accordingly indication of the strength thereof.

Since the contacts 92 of the switch arrangement 78 are normally closed and since the thermostatic switch 76 is normally conducting, it will be evident that, when power is applied to the terminal assembly 72, both heater 62 and heater 64 will be initially energized.

As heat is conducted from the heaters 62 and 64 to the body member 60, to the inner surface of the recess 58 and subsequently to the liquid contained therein, slugs of the heated liquid will be expelled repeatedly from the recess 58 up through the pump tube to be dispersed and allowed to percolate through the ground coffee contained within the assembly 18. As these slugs of heated water are percolated through the ground coffee, heat will be generally dispersed throughout the liquid contained within the vessel 12 concomitant with extraction of the coffee essences from the ground coffee. Thus, the temperature of the fluid charged into the vessel 12 will be increased in proportion to the extent to which the coffee is brewed.

Furthermore, as the temperature of the brewing beverage gradually increases, the thermostat 94 will gradually lower the element 98 until finally the spring 102 will overcenter opening the contacts 92 whereby heater 62 will be removed from the circuit. At this stage, only the heater 64 will be energized; and this heater is arranged, as described hereinabove, to provide only sufficient heat to keep the brewed beverage sufficiently warm for serving.

Should power be applied to the terminal assembly 72 in the absence of a reasonable volume of fluid within the vessel 12 or should the warming of the coffee be extended to the point where all or substantially all of the water is boiled away, heat will no longer be withdrawn from the body member 60 in a rapid fashion. Under such conditions, the temperature of member 60 will rise quickly; and when this temperature reaches a point at which the heat so provided can deleteriously effect the gasket 46, thermostat 76 will open thereby removing all energy from both the heater elements 62 and 64. Thus, the coffee brewer of the invention completely obviates thermal damage to the main sealing gasket 46, which damage could result from neglect or improper operation of the appliance.

Turning now to FIGS. 9 and 10 for a more detailed description of the coffee basket, fluid spreader and pump tube assembly 18, a cylindrical pump tube 140 is shown having a closure cup 142 and a resilient bumper 144 secured to its lower end. The upper end of pump tube 140 is adapted to extend through the standpipe-and-guide unit 146 of coffee basket 148, suitable clearance being provided between pump tube 140 and standpipe unit 146. Pump tube 140 is additionally fashioned with a circumferential bead 150 to be used in supporting coffee basket 148 in proper position.

According to a feature of the invention, pump tube 140 is provided with a radial vent hole 152 communicating with the interior of standpipe 146 in the area above bead 150. By providing a passageway through which all but the more vigorous surges of heated liquid may drain, vent hole 152 aids in eliminating the re-percolation of brewed coffee upon reheating. Contrariwise, when coffee is being brewed initially, vent hole 152 does not interfere with the vigorous surges of liquid rising through pump tube 140 to be dispersed over the ground coffee by fluid spreader 154.

In order to more effectively utilize the heat pump action afforded by means of well 58, the lower end of pump tube 140 is sealed within the well 58, as by having the closure cup 142 enter and wedgedly engage the inner surface of projection 54. This arrangement is best shown in FIG. 10. Advantageously, tube 140 is provided with a bead 156 beneath which cup 142 may be secured by means of a spacer 158, a washer 160 and the swaged or formed lip 162.

In compliance with a further feature of the invention, a resilient bumper 144 is disposed about spacer 158 between washer 160 and cup 142 to extend beyond the end of tube 140. Since bumper 144 is intended to be freely mounted about spacer 158, it is appropriate to provide a washer 164 between the bumper 144 and closure cup 142.

Bumper 144 is preferably fashioned with a scalloped or serrated bottom edge 166 and may be made from any suitable resilient material. In one specific embodiment, bumper 144 has proved to be satisfactorily fabricated from linear polyethylene, this material being known to possess superior chemical resistance and adequate heat resistance.

Being provided with the bumper 144, pump tube assembly 18 is obviously capable of absorbing the shock incurred when it is dropped onto the bottom of the glass vessel 12. Even with the basket 148 filled with wet coffee grounds, assembly 18 may be dropped onto the vessel 12 without danger of breaking the bottom of the vessel since a resilient engagement is insured by the nature and arrangement of bumper 144.

When closure cup 142 engages the inner surface of projection 54 in a snug manner, it is advantageous to provide cup 142 with an inlet port 168 which allows liquid to be drawn into the well 58 during brewing of coffee.

With reference to FIG. 11, a more effective water seal may be achieved between the glass vessel 12 and the bottom 34 by means of a resilient gasket 16a which incorporates an annular hollow 170. It has proved advantageous to include a slight bead 172 directly above the hollow 170 in order to establish a pressure point at thin or weakened section 174. Thus, section 174 is capable of flexing slightly, when equal pressure is applied between vessel 12 and bottom 34, to effect a water seal therebetween without applying undue strain to the vessel 12.

The specific example herein shown and described is illustrative only. Various changes in structure, no doubt, will occur to those skilled in the art; and these changes are to be understood as forming a part of this invention insofar as they fall within the spirit and scope of the appended claims.

The invention is claimed as follows:

1. An electric percolator comprising:
   (a) a transparent glass brewing vessel adapted to contain liquid and having an aperture in its lower end;
   (b) heat transfer means secured to said vessel adjacent said aperture, including a thermally conductive member having walls defining a well which opens into said vessel, said heat transfer means further including electric resistance means in thermal communication with said member;
   (c) thermally responsive electrical control means situated in thermal communication with the liquid in said vessel, said control means being electrically connected in series circuit with said resistance means to reduce the heat input to said member upon said vessel and its contents reaching a predetermined temperature;
   (d) pump tube means including a pump tube having its lower end open to said well and including means at said lower end sealingly engaging the interior surface of the walls defining said well;
   (e) basket means supported on said pump tube means spaced apart from said well, said basket means including a perforated sidewall portion adapted to receive and retain ground coffee and to pass liquid, said basket means further including a centrally disposed, imperforate, tubular portion open at both ends to define a standpipe, said standpipe telescopingly receiving the upper end portion of said pump tube in loosely fitting relationship; and
   (f) liquid-bypassing means including means defining a radial aperture in the sidewall of said pump tube opening into the space between said pump tube and said standpipe whereby, upon operation of said control means to reduce the heat input to said member, weak surges of liquid entering said pump tube from said well pass through said radial aperture to flow in a visually inconspicuous manner down the outside of said pump tube.

2. An electric percolator in accordance with claim 1 wherein said thermally responsive electrical control means includes a pair of horizontally disposed switch blades, means mounting similar ends of said blades in fixed position relative to said vessel, contact elements fastened to confronting surfaces of said blades at the free ends thereof, a bimetallic member attached to said mounting means to be disposed in thermal communication with the liquid in said vessel and operative to flex one of said blades to control the position of the said contact fastened thereto, a bushing-like formation fixed to said mounting means and defining a vertical, threaded bore aligned with the other of said blades, a threaded pin element threadedly engaging said bore and having an end portion abuttingly engaging said other blade, and a lever arrangement secured to the opposite end portion of said pin element to extend horizontally therefrom for use in adjusting the position of the contact fastened to said other blade whereby to regulate the temperature at which said contacts open, movement of said lever arrangement in a horizontal plane rotating said pin element to cause axial movement thereof relative to said formation, said lever arrangement including a plurality of arm elements and means interconnecting said arm elements in horizontally rigid relationship and with a limited amount of vertical freedom therebetween whereby to preclude vertical movement of the switch parts upon relative vertical movement of said arms within the limits of said freedom.

References Cited in the file of this patent

UNITED STATES PATENTS

| | | |
|---|---|---|
| 405,946 | Bulow | June 25, 1889 |
| 868,187 | Ives | Oct. 15, 1907 |
| 1,132,472 | Hagerty | Mar. 16, 1915 |
| 2,015,983 | Wolcott | Oct. 1, 1935 |
| 2,025,302 | Olds | Dec. 24, 1935 |
| 2,046,710 | Umstott | July 7, 1936 |
| 2,096,849 | Felix | Oct. 26, 1937 |
| 2,175,332 | Wertheimer | Oct. 10, 1939 |
| 2,213,723 | Smith | Sept. 3, 1940 |
| 2,281,319 | Newell | Apr. 28, 1942 |
| 2,551,563 | Jepson | May 1, 1951 |
| 2,573,237 | Wilcox | Oct. 30, 1951 |
| 2,676,241 | Schlumbohm | Apr. 20, 1954 |
| 2,712,055 | Campbell | June 28, 1955 |
| 2,754,399 | Edman | July 10, 1956 |
| 2,817,743 | Foster | Dec. 24, 1957 |
| 2,856,844 | Price | Oct. 21, 1958 |
| 2,900,895 | Schwaneke | Aug. 25, 1959 |
| 2,904,667 | Deist | Sept. 15, 1959 |
| 2,916,599 | Stiles | Dec. 8, 1959 |

FOREIGN PATENTS

| | | |
|---|---|---|
| 728,676 | Great Britain | Apr. 27, 1955 |
| 167,761 | Australia | May 28, 1956 |